United States Patent [19]

Siegenthaler

[11] Patent Number: 5,174,939
[45] Date of Patent: Dec. 29, 1992

[54] METHOD OF MANUFACTURING A REINFORCED TIRE COMPONENT

[75] Inventor: Karl J. Siegenthaler, Ostia, Italy

[73] Assignee: Bridgestone Corporation, Tokyo, Japan

[21] Appl. No.: 786,689

[22] Filed: Nov. 1, 1991

[30] Foreign Application Priority Data

Dec. 4, 1990 [IT] Italy .................. 67961-A/90

[51] Int. Cl.⁵ ............................................. B29C 47/02
[52] U.S. Cl. ................................... 264/146; 156/177; 156/244.19; 156/244.25; 264/167; 264/171; 264/174; 425/114; 425/377; 425/514
[58] Field of Search ............. 264/167, 171, 174, 146; 156/177, 181, 244.15, 244.25, 244.19; 425/114, 115, 516, 377, 514

[56] References Cited

U.S. PATENT DOCUMENTS

| 3,616,001 | 5/1968 | Addis | 156/177 |
|---|---|---|---|
| 4,052,239 | 10/1977 | Chen . | |
| 4,172,748 | 10/1979 | Petzetakis . | |
| 4,507,164 | 3/1985 | Pott | 156/181 |
| 4,563,140 | 1/1986 | Turecek | 425/114 |
| 4,600,456 | 7/1986 | Oswald | 156/177 |
| 4,613,390 | 9/1986 | Mela | 156/177 |
| 4,744,745 | 5/1988 | Harada et al. . | |
| 4,755,334 | 7/1988 | Grimm et al. | 264/167 |
| 5,002,621 | 3/1991 | Ikeda | 156/177 |
| 5,009,732 | 4/1991 | Ikeda et al. | 156/177 |

FOREIGN PATENT DOCUMENTS

| 1232211 | 5/1971 | United Kingdom | 264/150 |
|---|---|---|---|
| 1384812 | 2/1975 | United Kingdom . | |
| 8904772 | 6/1989 | World Int. Prop. O. . | |

Primary Examiner—Jeffery Thurlow
Attorney, Agent, or Firm—Ernst H. Ruf

[57] ABSTRACT

A method of manufacturing a reinforced component of a motor vehicle tire carcass, in particular a body ply (2) and/or tread ply (3), whereby an elongated reinforcing element (5) is fed onto a substrate (7) along a generally sinusoidal path to form a reinforcing layer (29) defined by a succession of straight, substantially parallel portions (27) of the elongated reinforcing element (5) joined successively by curved end portions (28) thereof; the reinforcing layer (29) being moved substantially transversely in relation to the straight portions (27) to cooperate with an extrusion unit (34) which covers at least one surface of the reinforcing layer (29) with a covering layer (27,38)(37a,38a) of uncured elastomeric material.

6 Claims, 4 Drawing Sheets

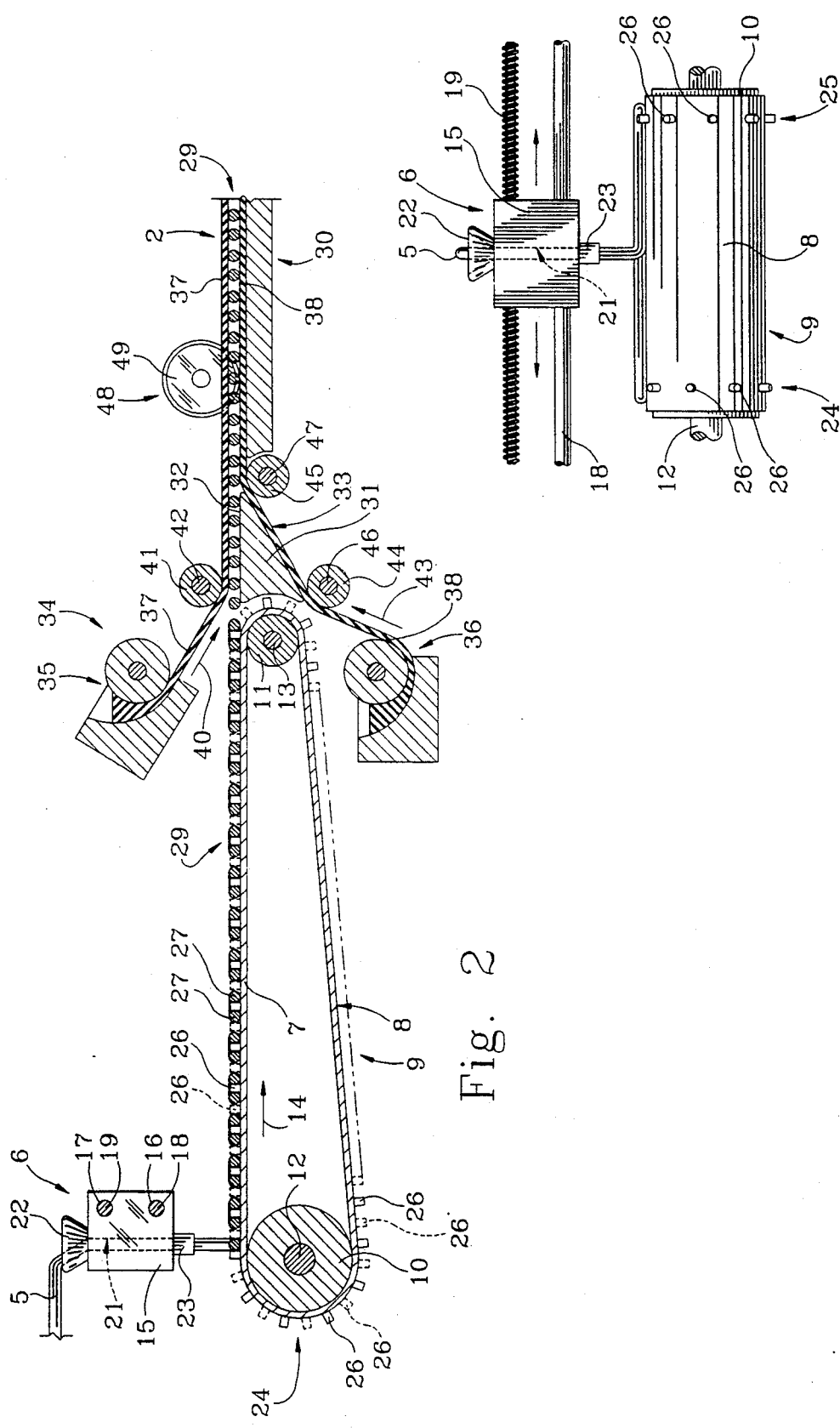

METHOD OF MANUFACTURING A REINFORCED TIRE COMPONENT

TECHNICAL FIELD

The present invention relates to a method of manufacturing a reinforced component of a motor vehicle tire carcass, in particular, a body ply and/or tread ply.

BACKGROUND OF THE ART

In known tire manufacturing plants, reinforced components, such as a body ply or tread ply, are usually formed from textile cords which, after undergoing a series of processing operations, are arranged in parallel to form the axial warp of a textile strip or fabric. Such processing usually consists of a calendaring operation, whereby both sides of the textile strip are coated with rubber to produce a rubber-coated strip in which the cords are arranged axially. The rubber-coated strip is then subjected to a cutting and splicing operation, whereby it is cut into portions, the cutting direction being substantially perpendicular to the axial warp for body plies, and at an angle of other than 90° to the axial warp for the tread plies. Said portions are then turned through 90° and the original lateral ends spliced to form a composite strip constituting the required reinforced component, in which the cords are arranged transversely or at a given angle in relation to the longitudinal axis of the composite strip.

By virtue of the number of operations required for producing said composite strip, the noted method of manufacturing said reinforced component clearly involves considerable cost. Moreover, said composite strip presents a number of transverse splices which may result in unacceptable vibration of the finished tire.

A further possible drawback of known reinforced components of the aforementioned type is that each cord portion inside the component originates from a respective cord of ideally infinite length fed onto the press and having its own "history" independent of that of the adjacent cords. In other words, by virtue of containing a large number of independent cord portions in terms of age, composition (which cannot be absolutely identical for all the cords), humidity, elasticity, size, etc., known reinforced components of the aforementioned type contain numerous independent, at times uncontrollable, variables making consistent results extremely difficult to achieve.

SUMMARY OF THE INVENTION

The aim of the present invention is to provide a method of manufacturing a reinforced component of a motor vehicle tire carcass, in particular a body ply and/or tread ply, designed to overcome the above-noted drawbacks. With this aim in view, according to the present invention, there is provided a method of manufacturing a reinforced component of a motor vehicle tire carcass, in particular a body ply and/or tread ply, characterized by the fact that it comprises stages consisting in feeding at least one elongated reinforcing element onto a substrate along a substantially sinusoidal path, to form a reinforcing layer defined by a succession of straight, substantially parallel portions of said elongated reinforcing element, said straight portions of the same element being joined successively by curved end portions; moving said reinforcing layer substantially transversely in relation to said straight portions, so as to cooperate with an extrusion unit; and applying, by means of said extrusion unit, a covering layer of uncured elastomeric material onto at least one side of said reinforcing layer, to produce said reinforced component; said covering layer preferably consisting of a shaped covering layer varying in thickness in the direction of extension of said straight portions of said elongated reinforcing element. According to a preferred embodiment of the above method, said elongated reinforcing element is preferably a cord coated with uncured elastomeric material. Said extrusion unit preferably comprises at least one variable contour extruder.

BRIEF DESCRIPTION OF THE DRAWINGS

A non-limiting embodiment of the present invention will now be described by way of example with reference to the accompanying drawings, in which:

FIG. 2 shows an axial section of a part of the FIG. 1 machine;

FIG. 3 shows an end view of the machine portion in FIG. 2;

BEST MODE FOR CARRYING OUT THE INVENTION

Figure 1:
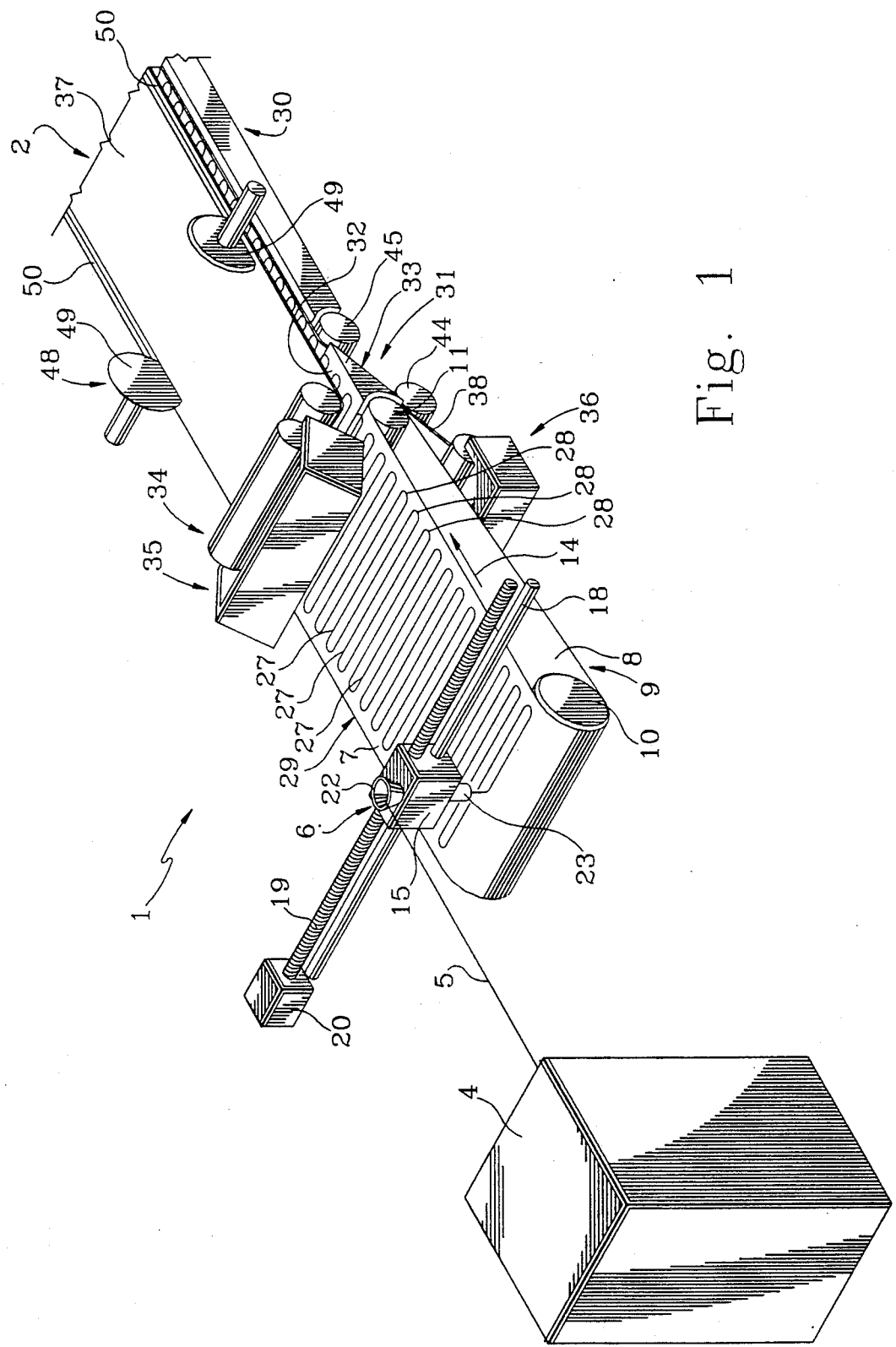
FIG. 1 shows a schematic view, in perspective, of a manufacturing machine implementing the method according to the present invention for producing a first type of reinforcing element.
Figure 5:
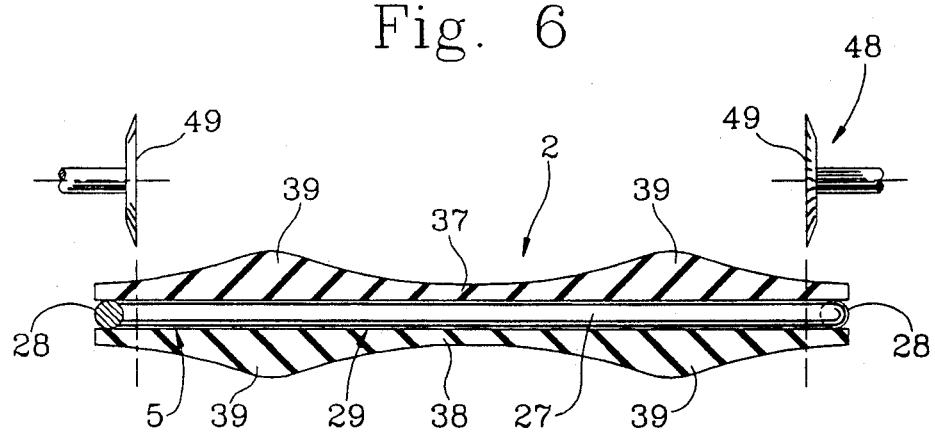
FIG. 5 shows a cross section of a first reinforcing element produced on the FIGS. 1 and 4 machine operating in the FIG. 4 mode.
Figure 7:
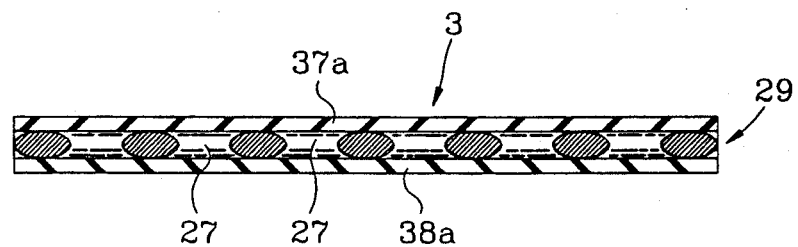
FIG. 7 shows a cross section of a second reinforcing element produced on the FIGS. 1 and 4 machine operating in the FIG. 6 mode.

Number 1 in FIG. 1 indicates a machine for manufacturing reinforced components of motor vehicle tires, such as a body ply 2 (FIG. 5) and/or a tread ply 3 (FIG. 7). Machine 1 comprises a known feeding device 4 for feeding a cord 5, preferably coated with uncured elastomeric material, to a distributing device 6, which feeds cord 5 onto a surface or substrate defined by the top portion 7 of the belt 8 of a conveyor 9. Belt 8 is looped about two rollers 10 and 11 fitted onto respective parallel horizontal shafts 12 and 13, shaft 12 being powered so as to turn about its axis (clockwise in FIG. 1) and feed belt 8 at a given constant speed in the direction of arrow 14 and perpendicular to the axes of shafts 12 and 13.

Figure 6:
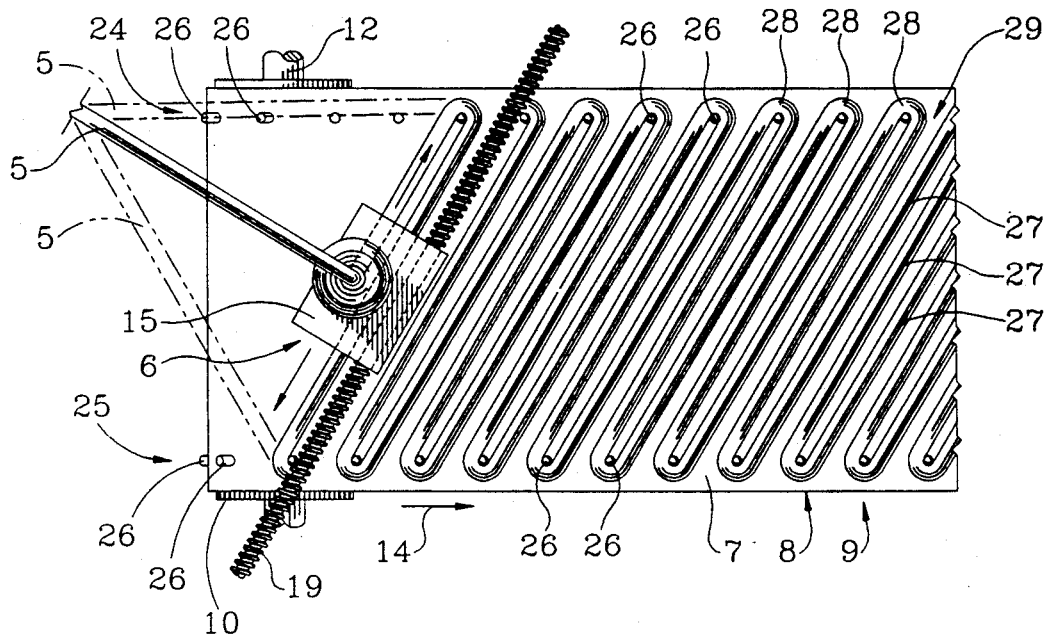
FIG. 6 shows a plan view, similar to FIG. 4, of the FIGS. 1 and 3 machine in a further operating mode.

As shown more clearly in FIGS. 2, 3 and 6, distributing device 6 comprises a block 15 having two horizontal through holes 16 and 17. Hole 16 is a smooth cylindrical hole engaged in a sliding manner by a guide rod 18 supported on a mobile support (not shown) enabling rod 18 to be oriented between a horizontal position perpendicular to the direction of arrow 14 (FIG. 4) and a horizontal position (not shown) at an angle of about 60° to the direction of arrow 14. Hole 17 is a threaded hole connected, via a screw-nut screw coupling, to a screw 19 constituting the output member of an actuating device 20 (FIG. 1) orientable with rod 18 and designed to slide block 15 back and forth along rod 18 and over substantially the entire width of belt 8.

Figure 4:
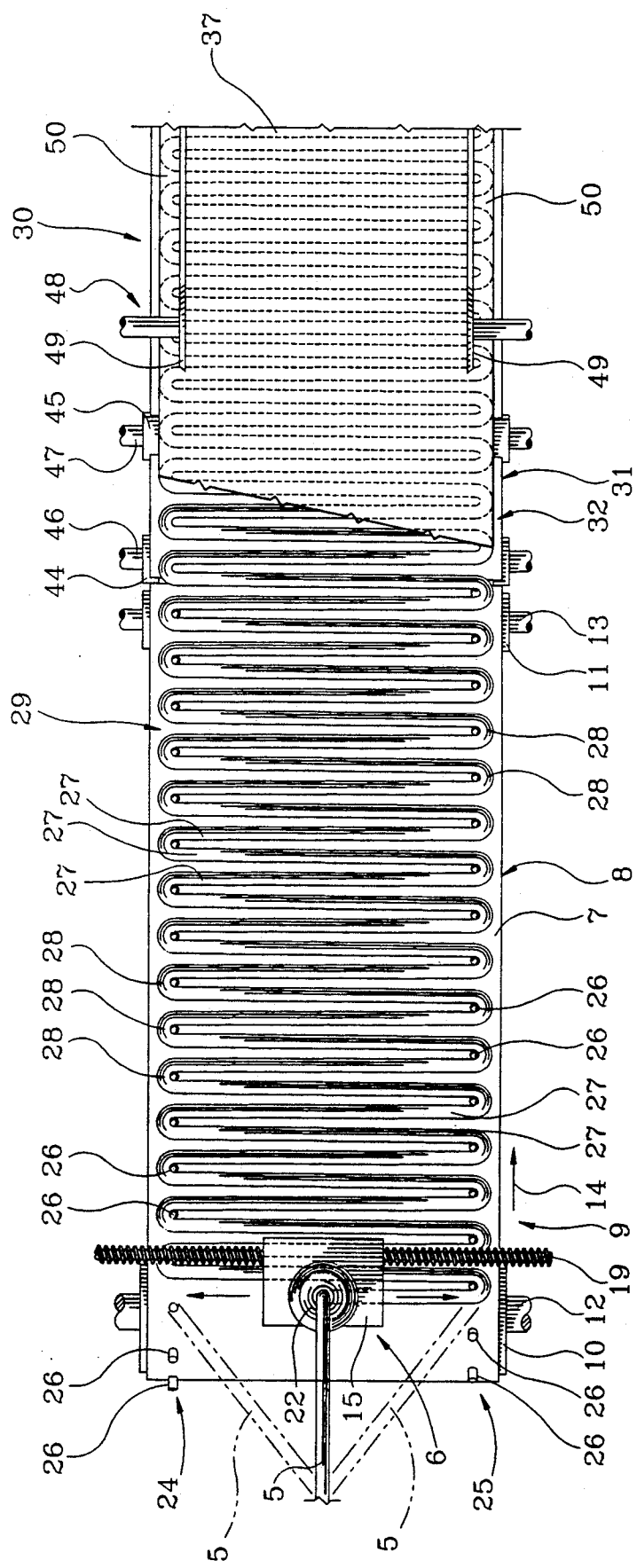
FIG. 4 shows a plan view of the machine portion in FIG. 2, with parts removed for simplicity.

Block 15 presents a further through hole 21 perpendicular to portion 7 of belt 8 and communicating, at the top, with a funnel 22 for feeding cord 5 inside hole 21 and, at the bottom, with an output piece 23 facing portion 7. As shown in FIGS. 4 and 6, the outer surface of belt 8 includes two rows 24 and 25 of raised appendices 26. Rows 24 and 25 are located close to the opposite longitudinal edges of belt 8, the appendices 26 in one row being offset, in the direction of arrow 14, in relation to those of the other row.

Consequently, by feeding belt 8 at a given constant speed in the direction of arrow 14, while at the same time operating block 15 at such a second speed so as to move back and forth in the time taken by belt 8 to feed appendices 26 one step forward, cord 5 may be fed onto section 7 along a substantially sinusoidal path defined by a series of straight cord portions 27 substantially parallel to one another and to guide rod 18, and by two series of curved cord portions 28, each looped about a respective appendix 26 and blending two adjacent straight portions 27.

Cord portions 27 and 28 combine to define a reinforcing layer 29, which is fed by conveyor 9 to a second conveyor 30 substantially coplanar with portion 7 of belt 8 and blending with conveyor 9 via a triangular plate 31 having a horizontal upper surface 32 coplanar with portion 7, and a lower surface 33 sloping upwards towards conveyor 30 and blending with surface 32.

Machine 1 also includes an extrusion unit 34 consisting, in the example shown, of two variable contour extruders 35 and 36, located respectively above and beneath the end portion of conveyor 9 facing plate 31. According to a variation not shown, and provided cord 5 is coated with uncured elastomeric material, unit 34 may consist solely of upper extruder 35.

Extruders 35 and 36 are of the type described and claimed in U.S. Pat. No 4,744,745, the content of which is fully incorporated herein in the interest of full disclosure, and are designed to produce respective layers 37 and 38 of elastomeric material, each of which may be of flat (constant cross section) or of any contoured shape varying transversely in relation to the feed direction. In the FIG. 5 example, layers 37 and 38 of body ply 2 present variable profiles, each having two thicker intermediate longitudinal portions 39, whereas, on tread ply 3 in FIG. 7, said layers, numbered 37a and 38a, are of constant thickness or flat. As shown in FIG. 2, top layer 37 emanates from extruder 35 at substantially the same speed as conveyor 9, and is fed, in the direction of arrow 40, toward surface 32 of plate 31 over which a feed roller 41, mounted in a freely rotatable manner on a shaft 42 parallel to shafts 11 and 12, feeds layer 37 onto the upper surface of reinforcing layer 29.

As also shown in FIG. 2, bottom layer 38 emanates from extruder 36 at substantially the same speed as conveyor 9, and is fed, in the direction of arrow 43, toward surface 33 of plate 31 beneath which two feed rollers 44 and 45, mounted in a freely rotatable manner on respective shafts 46 and 47, parallel to shaft 42, feed layer 38 first onto surface 33 and then onto the bottom surface of reinforcing layer 29.

This completes the formation of body ply 2, which is then fed on conveyor 30 through an optional cutting station 48 including two disc cutters 49 for cutting off respective lateral strips 50 of body ply 2 (FIG. 1) and, if so desired, removing curved portions 28 of cord 5 to obtain a body ply 2 of predetermined width. If strips 50 are not removed, body ply 2 is of course formed initially to a predetermined width.

From the foregoing description, machine 1 clearly provides for simply and rapidly producing a continuous body ply 2 and/or tread ply 3 with no splices, of any cross section, and having a reinforcing layer 29 formed from a single cord 5, thus eliminating the structural drawbacks mentioned previously.

According to a variation not shown, in order to increase the output or production of reinforcing layer 29, two, three or a relatively limited number of cords 5 may obviously be used, each being fed onto conveyor 9 by a respective distributing device 6.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A method of manufacturing a reinforced component of a motor vehicle tire carcass, in particular a body ply and/or tread ply, comprising the steps of feeding at least one elongated reinforcing element onto a flat surface of a first moving conveyor along a substantially sinusoidal path, to form a reinforcing layer defined by a succession of straight, substantially parallel portions of said elongated reinforcing element, said straight portions of the same element being joined successively by curved end portions of said elongated reinforcing element; moving said reinforcing layer substantially transversely in relation to said straight portions while being supported on the flat surface of the first conveyor, so as to cooperate with an extrusion nit; applying, by means of said extrusion unit, a covering layer of uncured elastomeric material onto at least one side of said reinforcing layer in a substantially horizontal plane, thereby producing said reinforced component; and moving the reinforced component along a second conveyor as the elastomeric material is being applied to the reinforcing layer at the extrusion unit upstream of said second conveyor.

2. A method as claimed in claim 1 in which said covering layer is a shaped covering layer varying in thickness in the direction of extension of said straight portions of said elongated reinforcing element.

3. A method as claimed in claim 2 in which said elongated reinforcing element is a cord.

4. A method as claimed in claim 3 in which said elongated reinforcing element is coated with uncured elastomeric material.

5. A method as claimed in claim 4 in which said extrusion unit includes at least one variable contour extruder located between the first and second conveyors.

6. A method as claimed in claim 5, which further comprises the step of cutting said reinforced component to the required width by removing two lateral strips that include said curved portions of said elongated reinforcing element, after said reinforced component is formed and as said component is being moved by the second conveyor.

* * * * *